(12) United States Patent
Gran et al.

(10) Patent No.: US 11,603,318 B1
(45) Date of Patent: *Mar. 14, 2023

(54) LIME HYDRATE AND LIME HYDRATE SLURRY WITH IMPROVED REACTIVITY FOR WATER PURIFICATION

(71) Applicant: Mississippi Lime Company, St. Louis, MO (US)

(72) Inventors: Martin L. Gran, Chesterfield, MO (US); Randy Griffard, St. Mary, MO (US); Michael Stever, Arnold, MO (US); Kory Mueller, Ste. Genevieve, MO (US); Nathan Hooper, Farmington, MO (US); Scott Sipiorski, Eureka, MO (US)

(73) Assignee: Mississippi Lime Company, St. Louis, MO (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/790,195

(22) Filed: Feb. 13, 2020

Related U.S. Application Data

(60) Provisional application No. 62/805,114, filed on Feb. 13, 2019.

(51) Int. Cl.
*C01F 11/02* (2006.01)

(52) U.S. Cl.
CPC .......... *C01F 11/02* (2013.01); *C01P 2006/12* (2013.01)

(58) Field of Classification Search
CPC ....................................................... C01F 11/02
See application file for complete search history.

(56) References Cited

U.S. PATENT DOCUMENTS 6,451,281 B1    9/2002 Ebeling et al.

OTHER PUBLICATIONS

Ewis, Clifford J. and Boynton, Robert S., "Acid Neutralization with Lime for Environmental Control and Manufacturing Processes," National Lime Association, Bulletin No. 216, pp. 2-15 (16 pages).
Holmes, M. E., Fink, G. J., and Mathers, F. C., "Fundamental Properties of Commercial Limes," Chemical and Metallurgical Engineering, vol. 27, No. 25, pp. 1212-1216, dated Dec. 20, 1922 (5 pages).
Stoiber, Roman, "Slakers and movers," Lime Slaking, STT Enviro Corp Systems & Solutions, Canada, International Cement Review, Jul. 2015 (3 pages).

*Primary Examiner* — James A Fiorito
(74) *Attorney, Agent, or Firm* — Lewis Rice LLC

(57) ABSTRACT

A hydrated lime product which can be provided to an end user in dry form and which can be formed into a slurry which will comprise lime hydrate with sufficiently increased reactivity over that of traditional hydrated lime slurries to be competitive in reaction time with on-site produced slaked lime slurries.

10 Claims, 1 Drawing Sheet

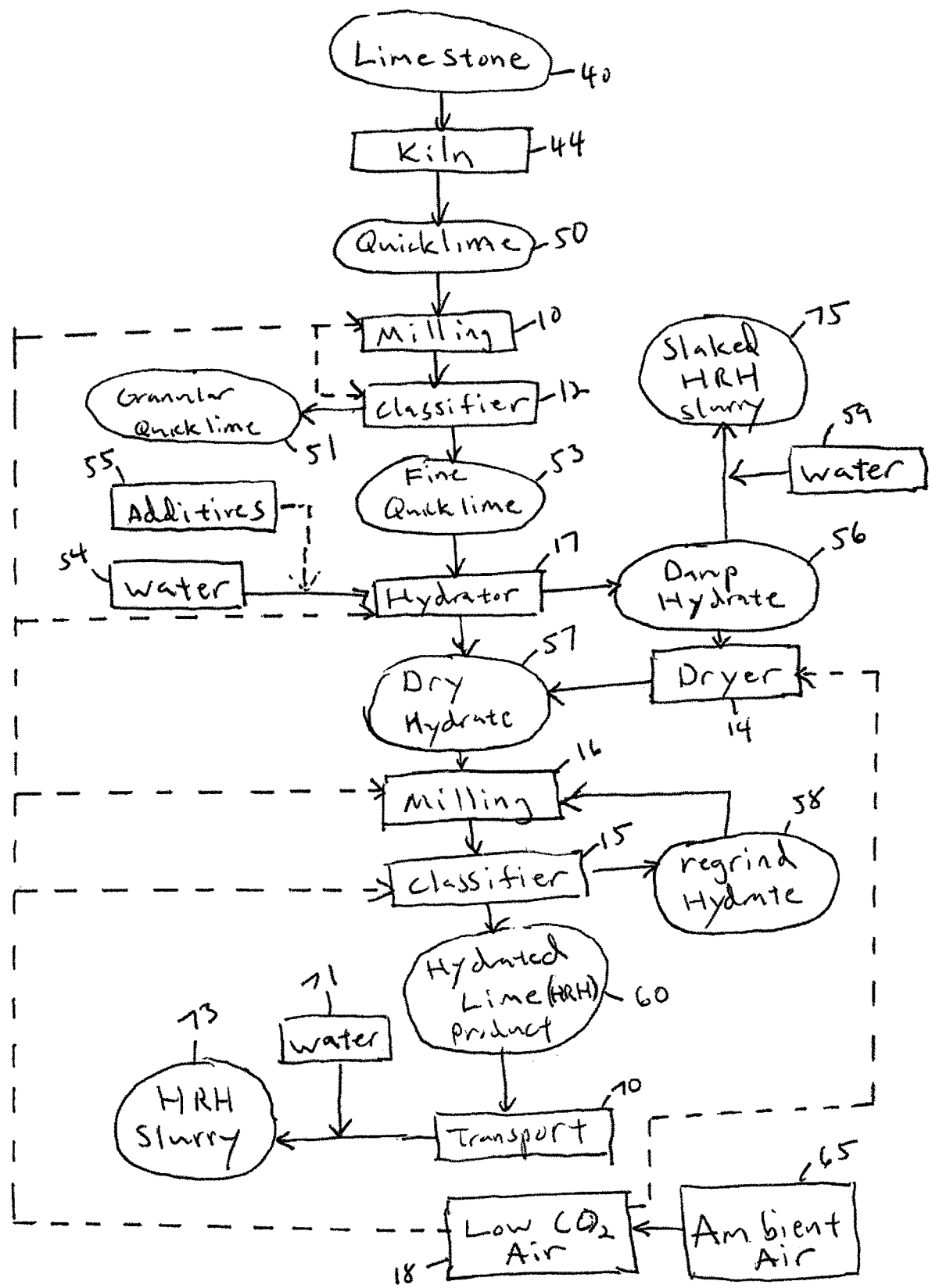

LIME HYDRATE AND LIME HYDRATE SLURRY WITH IMPROVED REACTIVITY FOR WATER PURIFICATION

CROSS-REFERENCE TO RELATED APPLICATIONS

This application claims the benefit of U.S. Provisional Patent Application Ser. No.: 62/805,114, filed Feb. 13, 2019, the entire contents of which are hereby incorporated by reference herein.

BACKGROUND OF THE INVENTION

Field of the Invention

This invention relates to water purification. Particularly, to the use of calcium hydroxide (lime hydrate) in the purification of water.

Description of the Related Art

Calcium carbonate (CaCO3), more commonly known as lime or limestone, is a naturally occurring substance having a number of industrially useful applications. It can be used to produce calcium oxide (CaO), also sometimes called "quicklime," by calcining in a kiln. Quicklime also has many industrial uses, and can be "slaked" (combined with water) to form calcium hydroxide (Ca(OH)2), also sometimes called "lime hydrate." Lime hydrate in this initial slaked form is commonly called "slaked lime." There is also a calcium hydroxide compound known as "hydrated lime" which is commonly produced by first removing the water and drying the compound.

Lime hydrate compounds are typically manufactured according to the following process. First, a lime feed (limestone) is heated in a lime kiln to a temperature above 825° C. to form quicklime in accordance with the following formula:

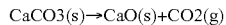

$$CaCO3(s) \rightarrow CaO(s) + CO2(g)$$

The quicklime is then continuously ground using a pulverizing mill until a certain percentage of the ground particles meet a desired size (e.g., 95% smaller than 100 mesh). Second, the resulting ground quicklime, meeting the desired size characteristics, is fed to a hydrator, where it reacts with water (the slaking process), and then is quickly dried to form calcium hydroxide in accordance with the formula:

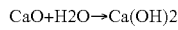

$$CaO + H2O \rightarrow Ca(OH)2$$

Finally, the resultant calcium hydroxide (e.g. hydrated lime) is then milled and classified until it meets a desired level of fineness or surface area for the target process.

Some of the applications for lime hydrate are to treat surface or well water in potable water treatment plants and to treat industrial wastewater and decant water in sludge plants. The lime hydrate is typically introduced into the process in a wetted form, such as a slurry, a paste, or as lime milk or limewater. This is because using the lime in a dry form usually creates dust problems that have to be overcome. There are generally two forms of lime hydrate which are provided in such wetted forms.

One such wetted form, regardless of water content, is referred to herein as a "slaked lime slurry." A slaked lime slurry is a lime slurry which has been formed from slaked lime and, essentially, never dried (although some water may have been removed or liberated as steam in the slaking process). A "hydrated lime slurry," on the other hand, refers to a slurry which has been made from a previously formed and dried lime hydrate (e.g., hydrated lime) that is then reintroduced to water to form a slurry or other wetted form. It should be recognized that the two forms should be expected to be chemically similar and perhaps identical. However, some debate exists about the efficiency of using slaked lime slurry or hydrated lime slurry in certain applications, and particularly in water treatment.

The debate exists because, in water treatment processes, the reactivity of the lime hydrate is important. Higher-reactivity compounds require less mass of lime hydrate to achieve the same result as lower-reactivity lime hydrates, and, often more importantly, react at a faster rate. For example, for water purification, the neutralization capacity and speed of neutralization increases with increased reactivity which can allow for the same amount of wastewater to be treated with less slurry and in a smaller plant.

It is generally believed that the smaller the particles in the lime hydrate, the more total surface area the compound has, and the more reactive the compound is. Hydrated lime slurries have been disfavored by some because it is thought that they have a larger particle size than slaked lime slurries (due to the drying and rewetting process), and therefore are less reactive. It is thought that slaked lime slurries contain smaller, more reactive lime hydrate particles than a hydrated lime slurry made by mixing water and hydrated lime because the lime hydrate particles agglomerate in the hydrated lime slurry, thereby producing a slurry containing lime hydrate particles having less effective surface area than in a slaked lime slurry. Thus, slaked lime slurries are generally preferred.

Users of slaked lime slurries have been faced with a difficult decision on how to form the slurry, however. Typically, those wishing to use a slaked lime slurry either have had to slake their own calcium oxide on site to produce the slaked lime slurry, or buy slaked lime already in slurry form. The latter is generally heavily disfavored because the high water content of the slurry (often 60% to 98% by weight of common lime slurries) adds substantial weight, which significantly increases shipping costs.

Water is widely available and much cheaper to acquire locally than ship. By preparing the slaked lime slurry at the water treatment plant where it is intended to be used, one eliminates the need to pay shipping costs for water. At the same time, slaking calcium oxide involves many variables that must all be controlled and accounted for to achieve optimal desired results as well as having specialized on-site machinery. These variables include, but are not limited to, temperature, water-to-lime ratio by weight, grit production, particle size, water composition, and agitation. Further, the slaking process is exothermic. This can make the process dangerous to those not familiar with it, but also can result in the lime being "burned" in the slaking reaction which damages the resultant hydrate and may make it substantially less reactive.

It is known that the size and quality of hydrated lime particles in a slaked lime slurry are dependent on at least these variables. Particularly, the reactivity, particle size, and gradation of the quicklime used influences the rate of slaking and the temperature of the slaking process. Other variables include the quality and quantity of water used. For example, water quality varies with the amount and type of impurities, such as sulfites, sulfates, and chlorides. Further, the temperature of the water and the degree of agitation can affect slaked lime quality and particle size. Producing a consistent slaked lime slurry requires controlling numerous process variables, which can add to the operating costs of a water treatment plant. These variables are also more difficult to manage on-site than in a controlled environment designed for the production of slaked lime slurries.

Users can purchase hydrated lime in dry form and reconstitute it to a hydrated lime slurry on site. Reconstituted hydrated lime slurries made from hydrated lime reintroduced to water typically do not require management of as many process variables, and typically are easier to produce at consistent quality than slaked lime slurries. Specifically, the slaking process has already been performed and reconstituting a slurry requires no attention to process variables (as they have been controlled previously) and also has no slaking reaction which needs to be controlled. To address the larger particle size through agglomeration of hydrated lime particles, it has been found that conditioning the hydrated lime slurry under agitation for 4 to 24 hours causes the agglomerates to break down into individual hydrated lime particles. However, this conditioning step is costly because of the extended processing time needed. As such, it is undesirable for many treatment plants.

Recognizing the inconsistencies in slaked lime slurries, and recognizing the desirability of a hydrated lime slurry that includes hydrated lime particles as small as the slaked lime particles in slaked lime slurries, there are patented methods of manufacturing micro-particulated hydrated lime slurries in, for example, U.S. Pat. No. 6,451,281, the entire disclosure of which is incorporated herein by reference. This patent discloses a method of mixing hydrated lime and water under high shear to create a slurry with micro-particulated hydrated lime. The median particle size disclosed in the U.S. Pat. No. 6,451,281 is approximately 6 micrometers or less. Producing a hydrated lime slurry using the method disclosed in the U.S. Pat. No. 6,451,281, the hydrated lime particles are as small as slaked lime slurry particles, have lower grit levels, are less abrasive, have higher rate of solution, are more consistent, are contaminant-free, and reduce scaling. These attributes make the resulting hydrated lime slurry preferable to some slaked lime slurries, including by having at least the same, and possibly better, level of reactivity.

Despite the benefits of such a hydrated lime slurry, there is a major downside. Namely, the hydrated lime slurry needs to be shipped as a slurry, meaning that transportation cost is inflated due to the high water content. Further, there is increased production cost in producing such a hydrated lime slurry instead of using more conventional methods. Thus, there remains an ongoing need for a more consistent slurry product with high reactivity, which is easily and economically transportable, particularly in the water purification and neutralization industry.

SUMMARY OF THE INVENTION

The following summary of the invention is provided to give the reader a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented in a later section.

Because of these and other problems in the art, there exists a need for a hydrated lime product which can be provided to an end user in dry form and which can be formed into a slurry which will comprise lime hydrate with sufficiently increased reactivity over that of traditional hydrated lime slurries to be competitive in reaction time with on-site produced slaked lime slurries.

There is described herein, among other things, a calcium hydroxide slurry comprising: calcium hydroxide particles having a reactivity of less than 15 seconds suspended in water; wherein the reactivity is the amount of time it takes the calcium hydroxide particles to neutralize in citric acid, the citric acid having a mass greater than 10 times the mass of the calcium hydroxide particles.

In embodiments of the slurry, the reactivity is less than 10 seconds, 8 seconds, 4 seconds, or 3 seconds.

In an embodiment of the slurry, 90% percent of the calcium hydroxide particles are less than or equal to about 10 microns and greater than or equal to about 4 microns; and a ratio of a size of particle 90% of the calcium hydroxide particles are below to a size of particle 10% of the calcium hydroxide particles are below is less than about 8.

In embodiments of the slurry, the calcium hydroxide particles have a BET surface area of about 18 $m^2/g$ or greater, about 20 $m^2/g$ or greater, or about 30 $m^2/g$ or greater.

There is also described herein, embodiments of a method of forming a calcium hydroxide slurry, the methods comprising: providing a lime feed comprising calcium oxide and impurities; milling said lime feed to produce a fine ground lime, wherein said fine ground lime has a particle-size distribution of less than 80% minus 200 mesh; feeding said fine ground lime into an air classification system; removing a refined fine lime from said air classification system wherein said refined fine lime has a particle size distribution of greater than 70% minus 200 mesh; adding water to said refined fine lime to form hydrated lime; drying said hydrated lime to form dried hydrated lime; and introducing said dried hydrated lime to water to produce a calcium hydroxide slurry.

In an embodiment of the method, the calcium hydroxide slurry has a citric acid reactivity of less than 15 seconds; wherein the citric acid reactivity is the amount of time it takes the calcium hydroxide slurry to neutralize in citric acid, the citric acid having a mass greater than 10 times the mass of the dried hydrated lime.

In embodiments of the method, the reactivity is less than 10 seconds, 8 seconds, 4 seconds, or 3 seconds.

In an embodiment of the method, 90% percent of calcium hydroxide particles in the dried hydrated lime are less than or equal to about 10 microns and greater than or equal to about 4 microns; and a ratio of a size of particle 90% of the calcium hydroxide particles are below to a size of particle 10% of the calcium hydroxide particles are below is less than about 8.

In embodiments of the method, the calcium hydroxide particles have a BET surface area of about 18 $m^2/g$ or greater, about 20 $m^2/g$ or greater, or about 30 $m^2/g$ or greater.

BRIEF DESCRIPTION OF THE DRAWING

FIG. 1 depicts a block diagram of an embodiment of a method of manufacturing a Highly Reactive Hydrate (HRH) slurry.

DETAILED DESCRIPTION OF PREFERRED EMBODIMENTS

It is important to understand that the specific contributors to a lime compound's reactivity in a particular process can be poorly understood. Every lime compound is different based on where the underlying limestone was mined and every type of application of a lime compound also includes variables (such as composition of slurry water) which can alter specific reactivity. However, in order to serve industry, there is a common push to find lime compounds that are generally more reactive than others.

It is known that reactivity of a lime compound to any target agent is based, at least in part, on surface area as the lime compound is typically a particulate composition and the target is typically a particle in suspension that the lime's reactivity is serving to remove from the underlying material.

Surface area assessments of a lime hydrate particulate composition can now take into account the shape of the particles within the composition, which contributes to reactivity in at least some cases. This is referred to as the "BET surface area" of the lime hydrate particulate composition. BET surface area is generally a determination of total surface area based on the theories of Stephen Brunauer, Paul Hugh Emmett, and Edward Teller (commonly called BET theory and discussed in S. Brunauer, P. H. Emmett and E. Teller, J. Am. Chem. Soc., 1938, 60, 309, the entire disclosure of which is herein incorporated by reference).

This methodology considers the available surface area of a solid for adsorbing gases or other materials, recognizing that surface area in such circumstances can be increased by the presence of pores and other related structures. BET surface area, therefore, takes into account that the total surface area is not only dependent on the size of the particles, but also on their shape. Particles with many holes (pores) may have a greater surface area than size alone would indicate.

There is wide industry recognition that BET surface area is a better indicator of available surface area for reaction, and commercially available lime hydrate products have focused on obtaining lime hydrate with high BET surface areas to provide for more effective adsorption. It is generally believed that a BET surface area above 20 $m^2/g$ achieves improved efficiency of reaction in a wide variety of applications. Two examples of lime hydrate compositions with increased BET surface areas are described in U.S. Pat. Nos. 5,492,685 and 7,744,678, the entire disclosures of which are incorporated herein by reference.

While the industry has focused on BET surface area as a proxy for reactivity, continued increases in BET surface area have led to diminishing returns, and, in some cases, a reversal of reactivity. It appears that not only is the total BET surface area relevant, but the actual shape and size of the pores is also relevant. Specifically, particles with large pores are believed to be relevant to minimizing the pore plugging effect during reaction. Therefore, while BET surface area has been determined to be a reasonable proxy for effectiveness of lime hydrates, it is not a complete one and a measure of "pore volume" is often utilized as yet another proxy for reactivity.

Specifically, when reaction time and kinetics are important, the external surface area of the particle may be more important than the internal surface area. The external surface area of the distribution of particles is an indication of the actual size of the lime hydrate particle as opposed to its available surface area. As the external or relative surface size increases, the particle size generally decreases. In contrast to large particles that may have a high total surface area, it is the outer surface of ultrafine particles that hold most of the free reactants that are believed to be needed for the actual reaction. Thus, one is tempted to return to the presumption that the smaller the individual particles in the composition, the higher the reactivity.

However, this still does not tell the whole story. In many cases, extremely small particles are actually less reactive than particles which are larger and have less external surface area. Because it appears to be the case that either traditional measure of surface area (smaller overall particle size or BET surface area of the composition) cannot accurately predict effective highly reactive compounds, particulate compositions can instead be classified based on acid reactivity.

As discussed in U.S. Pat. No. 10,307,728, the entire disclosure of which is herein incorporated by reference, in order to test reactivity of particular lime hydrate compounds, the reactivity of the compound to a weak acid (such as, but not limited to, citric acid) provides a reactivity time measurable with commercial instruments. In order to determine the citric acid reactivity of a particular lime hydrate composition, the amount of time it took 1.7 grams of lime hydrate to neutralize 26 grams of citric acid is measured. As a measurement of effectiveness, it is preferred that this value be less than or equal to 10 seconds in order to have a lime hydrate composition which is classified as being "highly reactive."

Highly Reactive Hydrate ("HRH") is a classification of lime hydrate compounds where the classification may be obtained based, in part, on citric acid reactivity. HRHs may be defined (in addition or in alternative to other methods) based on the citric acid reactivity of the compound (as discussed above) being at or below 10 seconds. HRHs will also typically have BET surface areas above 20 $m^2/g$, making them suitable for at least some uses based solely on their BET surface area. However, many HRHs will have BET surface areas above 30 $m^2/g$ and such a particularly high BET surface area can actually serve to define an HRH in some cases.

The traditional logic of "mill and classify" until a resultant composition with the desired BET surface area characteristic is obtained does not consistently or predictably produce HRH compositions. Alternative processes are needed. Such processes are described in, for example, U.S. Pat. Nos. 9,517,471; 9,963,386; 10,221,094; and 10,549,256 and U.S. patent application Ser. No. 14/289,278, filed May 28, 2014. The entire disclosures of all of these documents are herein incorporated by reference. These processes produce lime hydrate particulate compositions that can perform as necessary to be classified as HRH, generally by citric acid reactivity, BET surface area, or a combination of both. These processes can also produce HRH compounds which can be identified by structural characteristics. For example, particle size distribution ratios of the D10/D90 can be used as can ratios of the compounds D50/D90.

While it may be provided in a variety of forms, in an embodiment, the HRH is a dry solid generally free of excess moisture and an "HRH slurry" as used herein is an aqueous suspension or other composition of HRH after dry HRH has been reintroduced to water. However, in an alternative embodiment, the slaked lime used in the formation of HRH may also be used straight or added to additional water, which is described as a "slaked HRH slurry" herein. Typically, an HRH slurry or a slaked HRH slurry will comprise between 60% and 98% water by weight.

In order to determine the citric acid reactivity of a particular hydrated lime composition, the amount of time it took 1.7 grams of non-aqueous lime hydrate to neutralize 26 grams of citric acid will typically be measured. As a measurement of effectiveness, it is preferred that this value be less than or equal to 15 seconds, preferentially less than 10 sec, and optimally less than 7 sec in order to have a hydrated lime composition which is classified as being an HRH.

HRH may also be described by having available calcium hydroxide concentration of greater than 92% by weight, preferentially greater than 94%, and optimally greater than 95%. HRH may also be described by having at least 90% of particles less than 10 microns, preferentially less than 8 microns. At least 50% of the particles are less than 4 microns, preferentially less than 3 microns. The product may also be described as having a BET surface area of at least 18 m2/g, preferentially at least 19 m2/g, 20 m2/g, or 30 m2/g.

In an embodiment, 90% of the particles in an HRH are less than or equal to about 10 microns and greater than or equal to about 4 microns and a ratio of a size of particle 90% of the particles are below to a size of particle 10% of the particles are below is less than about 8. The particles preferably have a BET surface area of about 18 m2/g or greater or about 20 m2/g or greater. Depending on embodiment, the d90/d10 ratio is less than 6, between 4 and 7, or between 5 and 6.

In an HRH like the above, 90% percent of the particles may be less than or equal to about 8 microns and greater than or equal to about 4 microns, less than or equal to about 6 microns and greater than or equal to about 4 microns, or less than or equal to about 5 microns and greater than or equal to about 4 microns.

In an embodiment of an HRH, 50% of the particles are less than or equal to about 4 microns, less than or equal to about 2 microns, and may be greater than 1 micron.

FIG. 1 depicts a block diagram of an embodiment of method of manufacturing what can be classified as an HRH slurry. In the depicted embodiment of FIG. 1, after a limestone feed (40) has been heated in a lime kiln (44) to a temperature above 825° C. (1517° F.), quicklime (50) is formed. The deposited quicklime (50) is then subjected to fine grinding and/or milling (10) and classification (12) to produce a fine quicklime (53) and a low dust granular quicklime (51) which is typically removed as an alternative product. The fine lime (53) can be of varying sizes in different embodiments. Any method of grinding or milling (10) is suitable, including for example, the use of fine grind cage mill, swing hammer mill, screen mill, etc., where the amount of milling produces the desired particle-size distribution. The depicted fine quicklime (53) (and resultant steps) may also be produced and performed using the methodology of U.S. Pat. No. 9,963,386.

In an embodiment, the fine quicklime (53) will have a particle-size distribution of greater than about 80% minus 200 mesh. In another embodiment, it will be greater than about 93.5% minus 200 mesh. It should also be noted that "mesh" refers to the common use of the term "mesh" as it relates to particle-size distribution; that is, a mesh screen or sieve need not be used to measure or classify the particle size (although it is suitable in some embodiments). Instead, an air classification system is preferable.

Quicklime is generally not stable and, when cooled, will spontaneously react with atmospheric $CO_2$ until, after enough time, it is converted back to calcium carbonate. The milling (10) and classification (12) of the quicklime (50) should preferably be performed in a closed-circuit system to prevent air slaking and recarbonation (i.e., CaO to $CaCO_3$), although a closed-circuit system is by no means required. In some embodiments, other measures are employed to prevent recarbonation. For example, conditioned low-$CO_2$ air (18) can be injected into these systems to replace any air being drawn in and around the process equipment bearings and seals. This conditioned air (18) may also be useful if the quicklime is pneumatically conveyed. A process for conditioning air is discussed more fully below and is also described in U.S. Utility Pat. No. 6,200,543, the entire disclosure of which is incorporated herein by reference.

As noted above, the depicted fine quicklime (53) then undergoes a hydration or slaking process. The hydration process may utilize a hydrator (17), and in an embodiment, the fine quicklime (53) is combined with water (54), which may include additives (55), and is rapidly mixed, which allows the fine quicklime (53) to react with the water (54) to form either a dry (57) or "damp" calcium hydroxide composition (56) which will include the additives (55), if present. Whether dry (57) or damp (56) calcium hydroxide is produced will generally depend on the amount of water (54) provided. It is generally preferred that the amount of water (54) be such that the water is essentially entirely consumed in the reaction process resulting a dry hydroxide composition (57) with less than 2% residual moisture, or less than 1% residual moisture.

However, in an alternative embodiment, the water (54) may be provided in a level to produce a "damp" hydrate (56) as contemplated in, for example, U.S. Pat. No. 10,221,094 the entire disclosure of which is herein incorporated by reference. Alternatively, a complete excess of water may be used to produce a wet calcium hydroxide composition (56) at what is essentially a slurry or at least wetter than where a hydroxide composition (56) can be considered damp. In an embodiment, a wet lime hydrate (56) that leaves the hydrator (17) has a residual moisture greater than 5% by weight.

Generally, the excess water level will be about 5-35% or about 10-25%. Alternatively, the residual moisture may be substantially lower and, in another embodiment, may be in the range of about 2% to about 4% producing a more damp lime hydrate (56). If a damp or wet hydrate (56) is produced, in an embodiment, water (59) may be added directly to the damp or wet calcium hydroxide (56) to produce a slaked HRH slurry (75) which can be used as otherwise contemplated herein. The slurry (75) will generally comprise around 30% or more water.

The water feed (54) is generally provided at a reasonably high temperature but low enough that the refined fine quicklime (53) is not overheated (burned) by the reaction (which is exothermic). In an embodiment, the water feed (54) and hydrator (17) temperature should be maintained below the boiling point of water, and more preferably, at a temperature equal to or below 82° C. (180° F.).

In an embodiment, one or more additives (55) may be included in the water feed (54) utilized in the hydration process. Typical examples of additives include accelerators or retarders, which, as their names suggest, accelerate or retard the conversion of calcium oxide to calcium hydroxide. Any known accelerators or retarders can be utilized, including, but not necessarily limited to, alkali and alkaline-earth chlorides (e.g., barium chloride, calcium chloride, sodium chloride, potassium chloride, aluminum chloride, etc.), salts (e.g., aluminum nitrate, sodium carbonate, sodium borate, potassium permanganate, potassium chlorate, table salt, Rochelle salt, etc.), acids (e.g., hydrochloric acid, sulfuric acid, oxalic acid, nitric acid, acetic acid, lactic acid, etc.), alkanols (e.g., mono-, di-, and tri-ethanolamine, dimethylethanolamine, methyl diethanolamine, triisopropanolamine, etc.), and sugars. Other non-limiting examples of accelerators and retarders, and their use in lime hydrate production can be found in U.S. Pat. Nos. 1,583,759; 1,649,602; 1,664,598; 2,193,391; 2,423,335; 2,437,842; 3,120,440; 4,626,418; 4,786,485; 5,173,279; 5,306,475; 5,308,534; 5,332,436; 5,502,021; 5,618,508; 5,705,141; 6,322,769; and 7,744,678 (the entire disclosures of all of which are incorporated herein by reference).

In an embodiment, other additives can be added to the slaking water to provide the lime hydrate specific properties.

For example, as contemplated in U.S. patent application Ser. No. 16/235,885, filed Dec. 28, 2018, sodium metal and/or sodium compounds such as, but not necessarily limited to, sodium carbonate ($Na_2CO_3$), sodium hydroxide (NaOH), sodium bicarbonate ($NaHCO_3$), and/or Trona ($Na_2CO_3$—$NaHCO_3$-$2H_2O$), is added to a lime hydrate composition to lower the resistivity of the resultant hydrate compound.

In the depicted embodiment of FIG. 1, after the lime has been slaked if it is dry lime hydrate (56) it may simply be sent to milling (16) and classification (15). If it remains damp or wet (56) (or in an alternative embodiment, even if it is dry, but this is generally not preferred), it may be pulled off and combined with water (59) to form a slaked HRH slurry (75) as discussed above. Alternatively, this wet or damp lime hydrate composition (56) may be dried in a heat dryer (14).

In a preferred embodiment, the damp/wet lime hydrate composition (56) is flash-dried using air from an indirect heat source at a temperature of about 285° C. (550° F.) to about 455° C. (850° F.). Using indirect heat inhibits the hydrate composition (56) from contacting the combustion gas, which can occur if a direct heat source is used. This contact would result in the loss of some of the available calcium hydroxide. In any event, the dried lime hydrate (57) generally will have a residual moisture content of about 2% or less or about 1% or less.

As noted above, the presence of atmospheric $CO_2$ may compromise the chemical integrity of the lime hydrate. While lime hydrate has greater moisture stability than calcium oxide, lime hydrate is nevertheless perishable unless adequately protected from $CO_2$ absorption, and the introduction of $CO_2$ into the lime hydrate can result in recarbonation (i.e., $Ca(OH)_2$ to $CaCO_3$). Thus, in an embodiment, chemical purity can be further improved if the indirect heat dryer (14) is supplied with conditioned air (18) having a reduced $CO_2$ content. Examples of apparatuses and methods for such air conditioning (i.e., reduction of $CO_2$ content in the air stream) are disclosed, for example, in U.S. Pat. Nos. 5,678,959 and 6,200,543 (the entire disclosures of which are incorporated herein by reference). In one preferred embodiment, ambient air (65) (e.g., about 300 ppm $CO_2$) is fed into an air conditioner resulting in conditioned air (18) with a $CO_2$ concentration of less than 100 ppm $CO_2$.

As noted above, conditioned air (18) with the same or different $CO_2$ concentrations as the conditioned air (18) for drying can also be fed into the mill (10), classifier (12), and/or hydrator (17) to help prevent recarbonation. Additionally, conditioned air (18) can be fed into any additional classifiers (15) and/or mills (16).

After being dried (if necessary), the depicted dried lime hydrate (57) is then preferably classified (15) and milled (16). The dried lime hydrate (57) is first fed into a classifier (15). If it meets the desired properties (e.g., BET surface area and particle size), dried lime hydrate (57) is utilized as the final lime hydrate product (60). Some of the dried lime hydrate (57), however, may not meet the desired properties. This regrind lime hydrate (58) is then fed into the mill (16) to be ground and then fed back into the classifier (15) to determine if the material can be utilized as the final lime hydrate product (60). This process of milling (16) and classifying (15) can generally continue for as long as is necessary.

Again, in a preferred embodiment, the milling (16) and classification system (15) are conducted in a closed-circuit system to prevent air carbonation from occurring. Conditioned air (18) (i.e., low $CO_2$ air) can further be injected into the milling (16) and classification system (15) to replace any transient air being drawn into the process and prevent recarbonation.

The above process of manufacturing describes a process in which the drying (14), classifying (15), and milling (16) of the damp lime hydrate (56) are conducted independently. As would be understood by one of ordinary skill in the art, milling and classification systems can be, and commonly are, integrated into one system wherein dried lime hydrate (57) is fed into the milling/classification system with injected conditioned air (18) and the resultant final lime hydrate product (60) has the desired properties as discussed above. Similarly, an integrated milling and classification system can be further integrated into a dryer wherein the damp lime hydrate (56) is fed into the milling/classification/dryer system and the resultant final lime hydrate product (60) has the desired properties as discussed above and is an HRH.

In any event, embodiments of the manufacturing process described herein result in a final lime hydrate product (60) with a high purity and surface area, fine particle size, and good reactivity and it can be considered an HRH so long as it meets those criteria. In particular embodiments, the final lime hydrate product (60) will generally have a purity of 96% available calcium hydroxide or greater and a particle size of less than about 44 microns (325 mesh) for about 98% of the particles. However, these lime hydrates will also have a citric acid reactivity of less than 15 seconds, less than 10 seconds, or less than 5 seconds and/or a BET surface area of above 30 $m^2/g$ or above 40 $m^2/g$. Once made, the HRH (60) will be reintroduced to water (71) after being transported to its location of use (70) to form the resultant HRH slurry (73).

The methods and resulting compounds forming HRH offer numerous improvements in the art. By using the HRH as the lime hydrate feed material with water to form an HRH slurry, a compound may be produced achieving similar properties to the micro-particulated hydrate slurry discussed above, surpass the performance of even high quality slaked lime slurries, and provide for consistent such performance even from slurries produced on site by the user.

The present disclosure further addresses the ability to ship a consistent product. The possibilities to ship a dry product having the performance benefits characteristics discussed above for an HRH allows for cheaper and more economical distribution. This is especially true compared to the cost of shipping liquid-form slurries, which perform no better, and often worse, than slurries formed on site from an HRH. The difference may be approximately 20 tons more dry material per shipment than the equivalent micro-particulated hydrate shipped in slurry form.

Shipping a dry product that may be mixed with an existing hydrate slurry mixing system also allows for a more consistent and superior end product. The hydrate produced may be controlled at the production facilities, removing variables such as water-to-quicklime ratio, grit production, particle size, slaking temperature control, neutralization speed and capacity, and more, from end user environments which typically have less control over these variables. Further, the final particle size of an on-site lime slake affects its usability and reactivity. With HRH, the particle size is, in the preferred embodiment for a D50 classified HRH slurry, around 3.5 microns, while generally high quality material otherwise varies between 4-6 microns. Thus, particle size of material in the resultant slurry can also be more finally controlled with shipping a dry HRH product than can be available for an onsite slaking operation.

In the context of water purification, the reactivity of any hydrate slurry is usually measured by pH neutralization capacity. When embodiments of an HRH slurry as described herein were tested as compared to high purity soft burned calcium oxide that was slaked in accordance to the ASTM specification C-110, the HRH slurry was more reactive and neutralized better than the lab formed slaked lime slurry with strictly controlled variables. These results come as a surprise because hydrated lime slurries formed from a previously dry lime hydrate are believed to have larger particle size, and, therefore, are less desired for slurries which would lead one to expect the HRH slurry, having been reconstituted to slurry form on-site from a dry material, to not perform as well. But, the variables that even the ideal slaking conditions must account for, as discussed above, fall away when compared to the improved reactivity of HRH.

The advantages to using an HRH slurry over a slaked lime slurry are many, and preclude such issues as, but not limited to: air slaking, size distribution of the lime, condition of the slaker, slaking temperature, water to lime ratio, distribution of slaking water, water quality, degree of agitation during slaking, and grit removal (no residue is created, obviating the need for a grit removal system entirely and resulting in less wear and tear on pumps and conveying lines). Using HRH as the basis for an HRH slurry is also believed to cause hydrate crystals to be formed smaller, and more reactive, than those in typical slaked lime slurry. Such crystals are believed to settle less in a slurry and therefore this also improves properties of the resultant HRH slurry. Due to properties of the embodiments described herein, users of HRH slurries are able typically to create higher percent solid slurry (and more consistent solids) which reduces storage costs and operating space and lessens scale formation in transfer lines and pumps.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "rectangular" are purely geometric constructs and no real-world component is a true "rectangular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric or other meaning of the term in view of these and other considerations.

The invention claimed is:

1. A method of forming a calcium hydroxide slurry comprising:
   providing a lime feed comprising calcium oxide and impurities;
   milling said lime feed to produce a fine ground lime, wherein said fine ground lime has a particle-size distribution of less than 80% minus 200 mesh;
   feeding said fine ground lime into an air classification system;
   removing a refined fine lime from said air classification system wherein said refined fine lime has a particle size distribution of greater than 70% minus 200 mesh;
   adding water to said refined fine lime to form hydrated lime;
   drying said hydrated lime to form particles of dried hydrated lime; and
   introducing said particles of dried hydrated lime to water to produce a calcium hydroxide slurry.

2. The method of claim 1 wherein:
   said calcium hydroxide slurry has a citric acid reactivity of less than 15 seconds;
   wherein the citric acid reactivity is the amount of time it takes the calcium hydroxide slurry to neutralize in citric acid, the citric acid having a mass greater than 10 times the mass of the dried hydrated lime.

3. The method of claim 2 wherein the citric acid reactivity is less than 10 seconds.

4. The method of claim 2 wherein the citric acid reactivity is less than 8 seconds.

5. The method of claim 2 wherein the citric acid reactivity is less than 4 seconds.

6. The method of claim 2 wherein the citric acid reactivity is less than 3 seconds.

7. The method of claim 1 wherein:
   90% percent of the particles of dried hydrated lime are less than or equal to about 10 microns and greater than or equal to about 4 microns; and
   a ratio of a size of particle 90% of the particles of dried hydrated lime are below to a size of particle 10% of the particle of dried hydrated lime s are below is less than about 8.

8. The method of claim 1 wherein the particles of dried hydrated lime have a BET surface area of about 18 $m^2/g$ or greater.

9. The method of claim 1 wherein the calcium hydroxide particles of dried hydrated lime have a BET surface area of about 20 $m^2/g$ or greater.

10. The method of claim 1 wherein the particles of dried hydrated lime have a BET surface area of about 30 $m^2/g$ or greater.

* * * * *